Oct. 7, 1969        J. W. SEEGER        3,470,823
CRANK MEANS HAVING AN ADJUSTABLE CRANK ELEMENT
Filed April 23, 1968
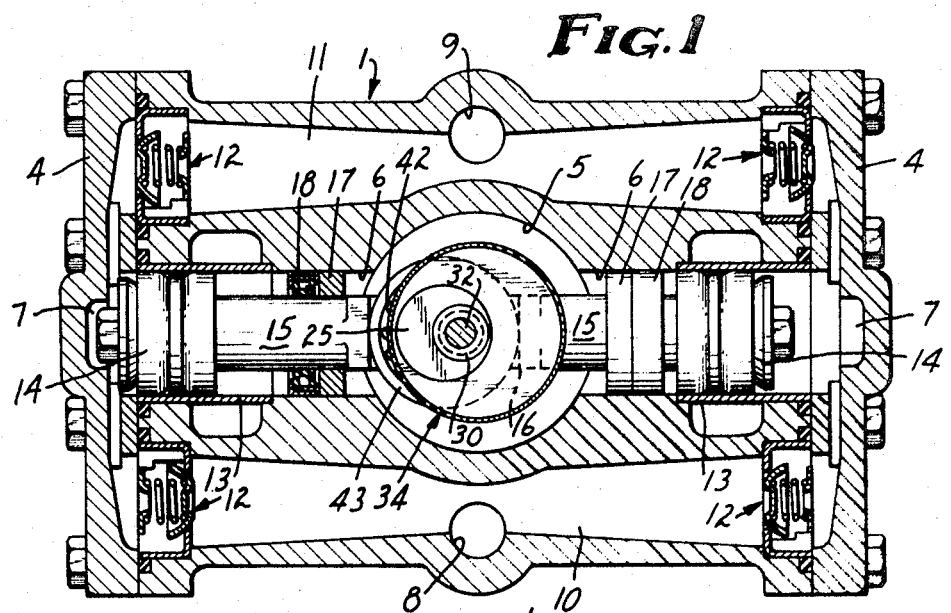
INVENTOR.
JOHN W. SEEGER
BY
Merchant & Gould
ATTORNEYS United States Patent Office 3,470,823
Patented Oct. 7, 1969

3,470,823
CRANK MEANS HAVING AN ADJUSTABLE CRANK ELEMENT
John W. Seeger, St. Paul, Minn., assignor to Seeger-Wanner Corporation, St. Paul, Minn., a corporation of Minnesota
Filed Apr. 23, 1968, Ser. No. 723,501
Int. Cl. F04b *49/00, 1/02;* F04d *15/00*
U.S. Cl. 103—38                                                    5 Claims

ABSTRACT OF THE DISCLOSURE

Crank means including a crankshaft, a crank element removably mounted on one end of the crankshaft and movable to be disposed at varying distances from the axis of the crankshaft, and a plurality of locking members selectively mounted on the crankshaft to lock the crank element thereon at different predetermined distances from the crankshaft axis.

BACKGROUND OF THE INVENTION

The present invention is in the nature of an improvement on adjustable cranks of the type disclosed in U.S. Letters Patent to William F. Wanner, No. 3,216,355, and issued Nov. 9, 1965. This prior structure relies on the shear strength of a pin which holds a crank element on the end of a crankshaft, against movements circumferentially of the mounting axis of the crank element.

SUMMARY OF THE INVENTION

The primary object of this invention is the provision of novel locking means for releasably locking a crank element on the end of a crankshaft at different predetermined distances from the crankshaft axis, which can be inexpensively produced, and by means of which the crank element can be quickly and easily shifted on the crank shaft and securely locked in place, to vary the "throw" of the crank. To this end, I provide a crankshaft having a longitudinal opening in one end radially spaced from the crankshaft axis, a cylindrical crank element having a longitudinal opening therethrough radially spaced from the axis of the crank element, a locking member including a disk-like portion engaging the end of the crankshaft and a flange portion engaging the crankshaft adjacent said end. The disk-like portion has an opening therethrough for snug reception of the crank element adjacent its inner end, the opening in the disk-like portion being radially offset a predetermined distance from the axis of the crankshaft. A locking screw extends through the opening in the crank element and is screw threaded in the opening in the crankshaft to hold the crank element against the crankshaft end. Engagement of the crankshaft by the locking member flange and the offset relationship of the opening in the disk-like portion of the crankshaft axis, prevents rotation of the crank element on the axis of the offset opening therethrough, to positively lock the crankshaft against movement transversely of the crankshaft. For the purpose of varying the radial distance between the crank element and the crankshaft axis, a plurality of locking members is used selectively, each locking member having a crankshaft receiving opening radially spaced from the crankshaft axis a different distance than the openings of the other locking members.

DESCRIPTION OF THE DRAWINGS

FIG. 1 is a view in cross section of a twin cylinder pump to which the present invention is applied, taken substantially on line 1—1 of FIG. 2;

FIG. 2 is a substantially axial section of the pump of FIG. 1;

FIG. 3 is an exploded perspective of the crankshaft means of this invention;

FIG. 4 is a view in perspective of the crank element of this invention, as seen from the end opposite that shown in FIG. 3;

FIG. 5 is a view in perspective of a bushing associated with the crank element; and FIGS. 6, 7 and 8 are views in end elevation of interchangeable locking members of this invention.

DETAILED DESCRIPTION

The crank means of this invention is applicable to various crank-operated devices, but is particularly adapted for use with fluid pumps of the reciprocating piston variety. A pump of this type is shown in FIGS. 1 and 2, and is fully disclosed in the above-mentioned Patent 3,216,-355. The pump, in and of itself, does not comprise the instant invention. Hence, for the sake of brevity, it is believed that a short general description of the pump will suffice. The pump of FIGS. 1 and 2 comprises a main body 1 having a central hub 2, secured thereto by means of screws or the like 3, and a pair of cylinder heads 4 bolted to opposite ends of the body 1. The body 1 defines at its central portion a crankcase 5, which communicates with a pair of axially aligned opposed cylinder openings 6 that communicate with pump chambers 7 defined by the opposite ends of the body 1 and the cylinder heads 4, the body 1 is further provided with inlet and discharge openings 8 and 9 respectively, that communicate with the pump chambers 7 by inlet and discharge passages 10 and 11 respectively and check valves 12. Cylinder sleeves 13 are mounted in the cylinder openings for 6 for slidable reception of pump pistons 14 that are rigidly connected together for common reciprocatory movements by a pair of piston rods 15 that are integrally formed with a yoke portion 16, the piston rod portions extending slidably through guide rings 17 and sealing rings 18 mounted in the cylinder openings 6.

The crank means of this invention includes a crankshaft 19 that is journalled in conventional roller friction bearings 20 mounted in the body 1 and hub 2, the crankshaft 19 having an axial opening 21 extending inwardly from its outer end, for reception of a suitable drive shaft, not shown. At its inner end, the crankshaft 19 is formed to provide a diametrically enlarged head 22, and is provided with a longitudinally extending screw threaded opening 23 that is counterbored, as indicated at 24. As shown, the counterbored opening 24 is disposed in radially offset or spaced parallel relation to the axis of the crankshaft 19.

A cylindrical crank element 25 is formed to provide a reduced diameter neck 26 at one end thereof and an annular shoulder 27, the neck 26 being concentric with the crank element 25. The crank element 25 is provided with a longitudinal bore 28 and a counterbore 29, the bore 28 extending through the neck portion 26. The bore 28 and counterbore 29 are disposed in radially offset or spaced parallel relation to the axis of the cylindrical crank element 25. A bushing 30, having a radially outwardly projecting annular flange 31 at one end, is press fitted into the bore 28, the flange 31 projecting longitudinally outwardly from the neck 26, see particularly FIG. 4. As shown in FIG. 2, the flange 31 is of a size to be snugly rotatably received in the counterbored portion 24 of the crankshaft 19. A locking screw 32 extends through the bushing 30, and has an enlarged head 33 that is received into the counterbore 29, the screw 32 being screw threaded into the opening 23 of the crankshaft 19 to releasably lock the crank element 25 in engagement with adjacent end of the crankshaft 9.

The radially offset relationship of the opening 23 and counterbore 24 to the axis of the crankshaft 19, and that of the bore 28 and counterbore 29 to the axis of the crank element 25, provides an arrangement whereby rotation of the crank element 25 on the common axis of the opening 23 and bore 28 disposes the crank element 25 at varying degrees of eccentricity relative to the crankshaft 19. The arrangement is such that the crank element 25 may be rotated between a position of concentric relationship to the crankshaft 19 to a position of maximum eccentricity 180 circular degrees from said concentric position. For the purpose of locking the crank element 25 selectively in one of a plurality of predetermined eccentric positions relative to the crankshaft 19, we provide a plurality of cup-like locking members. For the purpose of the present example, four such locking members are shown in FIGS. 3 and 6-8, these being indicated at 34, 35, 36 and 37. The locking members 34-37 are preferably stamped from sheet metal, each thereof being formed to provide a flat disk-like portion 38 that is adapted to lie flat against the inner end surface 39 of the crankshaft 19, and an axially projecting annular flange portion 40 that is adapted to snugly fit the enlarged head portion 22 of the crankshaft 19. Further, each of the disk-like portions 38 is drilled or pierced to provide a circular opening 41 for snug reception of the neck portion 26 of the crank element 25. The openings 41 are disposed in radially spaced relationship to the axis of the locking members 34-37, and to the axis of the crankshaft 19 when one of the locking members is applied thereto. As shown, the opening 41 is radially offset in each of the locking members 34-37 a different distance from the axis thereof than the others of the locking members 34-37.

Due to the fact that, when a given one of the locking members 34-37 is mounted on the crankshaft 19, the locking member can rotate only on the axis of the shaft 19, and further, due to the fact that the crank element 25 rotates only on the common axis of the bushing 30 and counterbore 24, any given one of the locking members 34-37 interposed between the crank element 25 and crankshaft 19 will securely lock the crank element 25 in a given predetermined eccentric position relative to and against shifting transversely of the crankshaft 19. Thus, when a given axial movement of the pistons 14 and yoke 16 is required, a selected one of the locking members 34-37 is interposed between the crankshaft 19 and crank element 25, the annular shoulder 27 of the crank element 25 engaging the selected locking member to hold the same against the inner end surface 39 of the crankshaft 19, when the anchoring screw 32 is screw threaded into place. The crank element 25 is shown as being operatively coupled to the pump yoke 16 by roller or needle bearings 42 and a bearing race or drive ring 43.

In the arrangement shown, the opening 41 in the locking member 34 is disposed a greater distance from the axis of the locking member 34 than are the openings 41 of the locking members 35-37. The openings 41 are progressively closer to the axis in the locking member 37, 36 and 35 respectively. Thus, when the locking member 34 is mounted on the crankshaft 19 and the crank 25 assembled thereto and placed in the pump, the axial movement or throw of the pistons 14 is greater than if any selected one of the locking members 35-37 were used.

During use of the above-described crank assembly in a pump, as shown, the output of the pump can be quickly and easily varied by removing the hub mounting screws 3 and pulling the hub 2, bearings 20 and crank assembly from the pump, and substituting one of the locking members 34-37 for that which is already mounted on the crankshaft 19, after which the hub and crank assembly may be quickly and easily remounted on the pump body 1.

What is claimed is:
1. Crank means comprising:
 (a) a crankshaft;
 (b) a cylindrical crank element extending longitudinally from one end of said crankshaft;
 (c) means journalling said crankshaft on an axis in spaced parallel relationship to the axes of the crankshaft and crank element, to dispose said crank element in positions of varying extent of eccentricity relative to said crankshaft;
 (d) locking means including a locking member having a flat disk-like portion for face-to-face engagement with said one end of the crankshaft and an axially extending flange portion for engagement with the crankshaft adjacent said one end, said disk-like portion having an opening therethrough radially spaced a predetermined distance from the axis of the crankshaft for snug reception of a portion of said crank element adjacent said one end of the crankshaft, whereby to rigidly hold the crank element in a given position of rotation on said axis of rotation thereof, and in a predetermined position of eccentricity relative to the crankshaft;
 (e) and means for relesably locking said crank element against axial movement away from said end of the crankshaft.

2. The crank means defined in claim 1, in which said crank element includes a diametrically reduced neck portion at one end adjacent said crankshaft end to define an annular shoulder, said neck portion being received in the opening of said locking member, said shoulder engaging said locking member to hold the locking member in engagement with said end of the crankshaft.

3. The crank means defined in claim 1, in which said locking means comprises a plurality of said locking members, the crank element receiving opening in each of said members being radially spaced from the axis of said crankshaft a different distance than the openings in the others of said locking members, said locking members being mounted selectively on said crankshaft to selectively position the crank element at different radial distances from the axis of said crankshaft.

4. The crank means defined in claim 1, in which said crankshaft is provided with a threaded and counterbored opening extending longitudinally inwardly from said one end on an axis radially spaced from the crankshaft axis, said crank element having a longitudinal bore therethrough in spaced parallel relation to the axis of the crank element, said means journalling the crank element on said shaft comprising a bushing in said crank element bore and journalled in the counterbore in said crankshaft.

5. The crank means defined in claim 4, in which said means for releasably locking the crank element against axial movement comprises a locking screw extending through said bore and bushing and screw threaded in said opening in the crankshaft.

References Cited
UNITED STATES PATENTS

| 2,702,008 | 2/1955 | Stockard | 103—171 X |
| 2,771,037 | 11/1956 | Johnston | 103—171 X |
| 3,118,381 | 1/1964 | Keil | 103—38 |
| 3,238,890 | 3/1966 | Sadler et al. | 103—171 |

LEONARD H. GERIN, Primary Examiner

U.S. Cl. X.R.

74—571; 103—171